United States Patent [19]
Keenan

[11] Patent Number: 5,505,939
[45] Date of Patent: Apr. 9, 1996

[54] INSTANT RECHARGEABLE COATING FOR FISHING TACKLE AND METHOD

[76] Inventor: Alexander J. Keenan, 11001 Totem Rd., Anchorage, Ak. 99516

[21] Appl. No.: 247,267

[22] Filed: May 23, 1994

[51] Int. Cl.⁶ .......................... A01N 25/00; A01K 85/00
[52] U.S. Cl. .......................... 424/84; 428/425.1; 428/507; 43/42.06
[58] Field of Search .................. 428/425.1, 507; 43/42.06; 424/84

[56] References Cited

U.S. PATENT DOCUMENTS

| | | | |
|---|---|---|---|
| 4,090,013 | 5/1978 | Ganslow et al. | 526/15 |
| 4,155,893 | 5/1979 | Fujimoto et al. | 526/328 |
| 4,245,420 | 1/1981 | Carr | 43/42.06 |
| 4,366,206 | 12/1982 | Tanaka | 428/373 |
| 4,389,513 | 6/1983 | Miyazaki | 525/186 |
| 4,826,691 | 5/1989 | Prochnow | 424/84 |
| 4,887,376 | 12/1989 | Sibley et al. | 43/42.06 |
| 4,927,643 | 5/1990 | D'Orazio et al. | 43/42.06 |
| 4,962,609 | 10/1990 | Walker | 43/42.47 |
| 5,026,596 | 6/1991 | Saotome | 428/406 |
| 5,146,707 | 9/1992 | Nichols | 43/42.53 |

FOREIGN PATENT DOCUMENTS 3-297340  12/1991  Japan .......................... 43/42

OTHER PUBLICATIONS

"Relative Lightweights" by Deborah Erickson, *Scientific American*, May 1992, pp. 128–129.

*Primary Examiner*—Mark D. Sweet
*Attorney, Agent, or Firm*—Palmer C. DeMeo

[57] ABSTRACT

The present invention pertains to a coating and method for coating fishing tackle that will absorb liquid attractants and attractants on contact by utilizing a polymer and/or co-polymer coating that is applied over a finished coating on the fishing tackle while the finished coating is in a liquid state.

42 Claims, No Drawings

INSTANT RECHARGEABLE COATING FOR FISHING TACKLE AND METHOD

BACKGROUND OF THE INVENTION

1. Field of the Invention

The present invention pertains to an absorbent coating and more particularly to applying said absorbent coating to fishing tackle where said absorbent coating will absorb liquid attractants and attractants on contact.

2. Description of Prior Art

It has been widely accepted that fish respond to scented attractants as well as visual stimuli. Many liquid scented attractants are currently being sold. But a constant problem has been in getting the attractant to stay on the tackle. Many attractants have had to resort to using gelling agents and other thickeners. U.S. Pat. No. 4,927,643 shows an example of a soluble fish-attractant coating. This is an example of forming cross-linked polymers to act as gelling agents. But there is no means for the gel to stay on the tackle. Oils used in this gel must be selected when the gel is made and can not be selected by the fisher person. It would be preferred to select a cross-linked polymer or co-polymer that would absorb liquid scented attractants. Liquid scented attractants would function as a plasticizer. One familiar with rubber compounds will be aware of how rubbers can absorb solvents and swell to several times their normal size.

Fishing lures have been created that have attractants blended into the material they are made of. Several examples of scented attractants incorporated into the lure material are disclosed in
U.S. Pat. No. 4,589,223 May 20, 1986 to Hastings and
U.S. Pat. No. 4,245,420 Jan. 20, 1981 to Carr.
However, natural oils and attractants can become rancid. Packaging items that contain liquid attractants can leak and become smelly. Scented attractants have limited shelf life. With so many liquid attractants on the market it would be an advantage to make fishing tackle that would accept any liquid attractant.

Different fibers and compounds have been added to lures to allow them to absorb liquid attractants. U.S. Pat. No. 4,962,609, Oct. 16, 1994, Walker discloses an example of a fiber coating used to hold liquid scents. Coating lures and hooks with fibers and other natural absorbent material can detract from their visual appeal. Many of these coatings depend only on capillary attraction. They are very limited as to what liquids they can hold. Textures of finished products can not be changed.

U.S. Pat. No. 5,026,596, to Saotome and U.S. Pat. No. 4,389,513, to Miyazaki clearly show that cross-linked polymers only bond well to porous items when the polymer is formed on an item. Another method must be found to form a strong bond that will not loosen when a plasticizer is applied.

SUMMARY OF THE INVENTION

The present invention pertains to a method for coating fishing tackle which will absorb liquid attractants and attractants on contact and to the coating per se. This invention presents a simple coating method that can be added to many existing production processes. While being simple the coating and process allow for a wide range of materials that can be used and also allow for a wide range of fishing tackle. Lures, weights, spoons, hooks, etc., are some examples of fishing tackle that can be coated by the method disclosed herein. By using cross-linked polymer and/or co-polymer particles a wide range of textures and rates of absorbency is possible. Also, since many of the polymer and/or co-polymer particles used in my process are expandable the variety of fishing tackle is increased. A manufacturer can easily produce an item with a desired texture for a specific attractant for a specific type of fish. Since most of the polymer and/or co-polymer particles used in my invention have indefinite shelf lives the fishing product can keep for years and still be as usable as the day it was made.

Accordingly, besides the objects and advantages of the coating described above, other objects and advantages of the present invention are:

a) to provide a coating that takes advantage of the fact that many lures have some type of finished coating that is in a liquid state when applied;

b) to provide a coating that gives greater flexibility in both the attractant that can be used and the texture of the final product;

c) to provide an coating that can be easily added to a existing manufacturing process;

d) to provide a coating where the rate of absorption of a liquid attractant can be controlled;

e) to provide a coating that can absorb a single liquid, selected liquids, or a wide range of liquids;

f) to provide a coating that can give a soft bodied or slime finish to otherwise hard finished tackle;

g) to provide a coating with very long shelf life.

DESCRIPTION OF THE PREFERRED EMBODIMENTS

The coating of my invention process takes advantage of advances in absorbent type polymers. There have been a number of polymers and co-polymers that will absorb 30+ times their weight of a liquid on contact. The coating is a two step process.

a) First a liquid finish is applied to the desired piece or item of finishing tackle.

b) Then a dry absorbent or mix of absorbent particles is applied to the liquid finish while the finish is still in the liquid state.

Only part of each absorbent particle will absorb some of the finish. Each absorbent particle will be bound to the finish and therefore the piece of tackle when the finish dries or cures.

A liquid finish can be applied to the piece of tackle by spraying, brushing, pad printing, or any other method that will apply a liquid finish to the desired area of a piece of tackle. A liquid finish can be any liquid that will:

a) Bind to the desired piece of tackle upon drying or curing;

b) Be absorbable by the absorbent particles being used;

c) Cure or dry with a layer of absorbent particles adhering to it;

d) Allow the liquid absorbed by the absorbent particles to dry or cure;

e) Not dissolve when an attractant liquid is added to or placed in water or liquid attractant after drying or curing.

The liquids of my invention will fall into two groups:

a) Self curing resins. Epoxies and polyesters are examples of these.

b) Liquids that must dry to harden. Lacquers, varnish, shellacs, urethanes, acrylics, enamels, hydrocarbon and water based paints are examples of these.

Absorbent particles can be applied to the liquid finish by air spraying, pouring, dipping, or any other method that will apply a desired coating of the absorbent to the finish. The size of the particles will determine the method of application. Absorbent particles can range from several microns in diameter to half an inch in diameter. They can range in shape from flat disks to round spheres. An absorbent particle can be any polymer or co-polymer that will:

a) Absorb a liquid finish.

b) Allow a finish to dry or cure both on the tackle and in the absorbent.

c) Stay bound to the piece of tackle through the dried or cured finish.

d) Absorb several times its weight in desired attractant.

e) Absorb liquids without chemically changing the liquid that is absorbed.

Absorbent particles will fall into two groups:

a) Lipidphilic polymer or co-polymer alkystyreene co-polymer Olefinic co-polymer Elastomer b) Hydrophilic polymer or co-polymer Amphoteric (anionic and cationic monomers) Anionic (carboxylate, sulfonate, phosphonate) Cationic (ammine, quaternary ammonium salts) Non-ionic (amide, lactam, hydroxyl, polyether) Zwitterionic (monomers having both cation and anion groups)

Examples of these absorbents are disclosed in

H. Miyazzki, U.S. Pat. No. 4,389,513, Jun. 21, 1983;

M. Fujimoto, T. Tamura, and T. Nagase, U.S. Pat. No. 4,155,893, May 22 1979;

K. Tanaka, U.S. Pat. No. 4,366,206, Dec. 28, 1982;

S. H. Ganslaw and H. G. Katz, U.S. Pat. No. 4,090,013, May 16, 1978;

alkystyrene co-polymer Imbiber Beads produced by Imbibitive Technologies; and olefinic co-polymer expandabeads produced by Big 'O' Inc.

Absorbent particles used in this invention are lightly cross-linked polymers and co-polymers. The greater the cross linking the less liquids will be absorbed but the greater the gel strength. The fewer the cross linking the greater will be the absorption of liquids but the weaker the gel. Cross linking can be reduced until there are so few cross links that the absorbent becomes soluble in liquid. By controlling the cross linking of the absorbent or absorbents used the rate of absorption of the attractant can be controlled. Also, the texture of the coating after the attractant is applied can range from a hard surface to a soft gel. The coating can also be a combination of desired textures. A coating can contain particles to absorb one liquid such as fish oil and other particles to absorb another liquid such as water or blood. Absorbents can be selected to absorb only certain selected liquid and no others.

Cross-linked polymers or co-polymers can be expanded. An expanded absorbent gives a greater rate of absorption while keeping the same strength and texture of an unexpanded particle when a desired liquid is applied. Many techniques are know for expanding polymers ranging from blowing agents to freeze drying. An absorbent can be expanded before application. Or an absorbent can be expanded after application. Several methods have been used to expand absorbents:

a) The use of a blowing agent has been well known as a method for expanding cross-linked polymers.

b) Richard W. Pekala, a leader at the Lawrence Livermore National Laboratory polymeric materials section, as shown that cross-linked polymers can be expanded by expanding the absorbent with an organic solvent, which is replaced by liquid carbon dioxide, then high pressure transforms the carbon dioxide into a supercritical fluid. The pressure is slowly released allowing the carbon dioxide to gasify leaving an expanded absorbent.

c) Freeze drying has also been used to expand an absorbent. The absorbent is expanded with a solvent and then freeze dried.

Polymer or co-polymer particles can become clear to translucent when fully absorbed with a liquid attractant. This will improve the visual qualities of the fish tackle and allow colors to show through. Transparency depends on particle size and which polymers or co-polymers are used.

EXAMPLE

An example of use is a salmon hook coated with a layer of epoxy resin and then a layer of 500 micron diameter expandabeads. The hook is allowed to cure. Once the epoxy is cured the expandabeads bond to the hook. Now the hook can be stored for several years. Before being used the hook is coated with anise, herring, or other liquid attractant. The expandabeads absorb the attractant. The hook will now have a soft layer holding the desired attractant.

This hook will now have an superior taste and texture compared to a uncoated hook.

Modifications of this invention will be readily apparent to those skilled in the art and it is intended that the invention be not limited by the embodiments disclosed herein but that the scope of the invention be defined by the appended claims.

What is claimed is:

1. An absorbent coating for an item of fishing tackle prepared by the method comprising:

a) applying a liquid finish coating to said item of fishing tackle wherein said liquid finish coating is selected from the group consisting of enamels, epoxies, lacquers, urethanes, acrylics, polyesters, varnish, shellacs, and hydrocarbon and water based paints, b) applying a polymer or co-polymer to said liquid finish coating wherein said polymer or co-polymer is selected from the group consisting of olefinic co-polymer, elastomers, and alkystyrene co-polymer, said polymer or co-polymer absorbing said liquid finish coating and a predetermined liquid fish attractant, wherein said polymer or co-polymer comprises particles that are applied to said liquid finish coating while said finish coating is in a liquid state, and c) curing or drying said liquid finish coating in the absorbent polymer or co-polymer particles preventing that part of the absorbent polymer or co-polymer particles from absorbing any other liquid and bonding the absorbent polymer or co-polymer particles to said item of fishing tackle.

2. The absorbent coating of claim 1 wherein said polymer or co-polymer particles absorb said liquid finish coating and said liquid fish attractant on contact.

3. The absorbent coating of claim 2 wherein said liquid finish coating adheres to said item being coated and to said particles upon curing or drying.

4. The absorbent coating of claim 3 wherein the size of said particles range from several microns to one-half inch.

5. The absorbent coating of claim 4 wherein said particles are applied to said finish coating by one of several methods selected from the group consisting of dipping, air brushing at low pressure and poring.

6. The absorbent coating of claim 5 wherein areas of said item that said particles adhere to are controlled by controlling areas of said item that are covered by said liquid finish coating.

7. The absorbent coating of claim 6 wherein said particles absorb said liquid finish coating and said liquid fish attractant without chemically changing said liquid finish coating and said liquid fish attractant that are absorbed.

8. The absorbent coating of claim 1 wherein said item of fishing tackle can be stored for several years and will readily absorb said liquid fish attractant when exposed to it.

9. The absorbent coating of claim 1 wherein said polymer or co-polymer particles absorb a wide range of liquid fish attractants allowing a fisher person to select said liquid fish attractant.

10. The absorbent coating of claim 9 wherein said liquid fish attractant comprises a natural oil.

11. The absorbent coating of claim 9 wherein said liquid fish attractant comprises an aqueous solution.

12. The absorbent coating of claim 9 wherein said liquid fish attractant comprises a natural oil and an aqueous solution.

13. The absorbent coating of claim 1 wherein said absorbent coating provides a base for said item of fishing tackle for the application of said liquid fish attractant to adhere to said item instead of running off of said item.

14. The absorbent coating of claim 1 wherein said polymer or co-polymer particles are selected so that said finish or absorbent coating becomes translucent upon absorbing said liquid fish attractant allowing color of said finish coating to show through.

15. The absorbent coating of claim 1 wherein desired gel characteristics of said absorbent coating are achieved by adjusting the degree of cross linking of the polymer or co-polymer particles by
   a) decreasing the amount of cross linking to decrease its strength, increase its rate of absorption and soften its gel characteristics or
   b) increasing the amount of cross linking to increase its strength, decrease its rate of absorption and harden its gel characteristics.

16. The absorbent coating of claim 15 wherein said absorbent coating is made from different polymer or co-polymer particles such that different coating textures, from a soft gel to a hard plastic, are obtained upon absorbing said liquid fish attractant.

17. The absorbent coating of claim 15 wherein said polymer or co-polymer particles are a mixture of different polymer or co-polymer particles such that each polymer or co-polymer particle absorbs a different liquid fish attractant or liquid fish attractants at different rates.

18. The absorbent coating of claim 1 wherein said polymer or co-polymer particles are expanded to a particular volume before or after bonding to said item of fishing tackle to increase the rate of absorption of said liquid finish coating and said liquid fish attractant by the use of blowing agents, freeze drying, or aerogel processes.

19. The absorbent coating of claim 1 wherein said item of fishing tackle is selected from the group consisting of lures, weights, spoons and hooks.

20. The absorbent coating of claim 1 wherein said absorbent coating of said item of fishing tackle can be recharged after said absorbent coating loses said liquid fish attractant due to evaporation or leaching out by reapplying said liquid fish attractant.

21. The absorbent coating of claim 1 wherein said polymer or co-polymer particles have the shape of spheres or flat disks.

22. A method of making an absorbent coating for an item of fishing tackle made by the following steps:
   a) providing an item of fishing tackle,
   b) applying a liquid finish coating to said item of fishing tackle wherein said liquid finish coating is selected from the group consisting of enamels, epoxies, lacquers, urethanes, acrylics, polyesters, varnish, shellacs, and hydrocarbon and water based paints,
   c) applying a polymer or co-polymer to said liquid finish coating wherein said polymer or co-polymer is selected from the group consisting of olefinic co-polymer, elastomers, and alkystyrene co-polymer, said polymer or co-polymer absorbing said liquid finish coating and a predetermined liquid fish attractant, wherein said polymer or co-polymer comprises particles that are applied to said liquid finish coating while said finish coating is in a liquid state, and
   d) curing or drying said liquid finish coating in the absorbent polymer or co-polymer particles preventing that part of the absorbent polymer or co-polymer particles from absorbing any other liquid and bonding the absorbent polymer or co-polymer particles to said item of fishing tackle.

23. The method of claim 22 wherein said polymer or co-polymer particles absorb said liquid finish coating and said liquid fish attractant on contact.

24. The method of of claim 23 wherein said liquid finish coating adheres to said item being coated and to said particles upon curing or drying.

25. The method of claim 24 wherein the size of said particles range from several microns to one-half inch.

26. The method of claim 25 wherein said particles are applied to said finish coating by one of several methods selected from the group consisting of dipping, air brushing at low pressure and poring.

27. The method of claim 26 wherein areas of said item that said particles adhere to are controlled by controlling areas of said item that are covered by said liquid finish coating.

28. The method of claim 27 wherein said particles absorb said liquid finish coating and said liquid fish attractant without chemically changing said liquid finish coating and said liquid fish attractant that are absorbed.

29. The method of claim 22 wherein said item of fishing tackle is stored for several years and will readily absorb said liquid fish attractant when exposed to it.

30. The method of claim 22 wherein said polymer or co-polymer particles absorb a wide range of liquid fish attractants allowing a fisher person to select said liquid fish attractant.

31. The method of claim 30 wherein said liquid fish attractant comprises a natural oil.

32. The method of claim 30 wherein said liquid fish attractant comprises an aqueous solution.

33. The method of claim 30 wherein said liquid fish attractant comprises a natural oil and an aqueous solution.

34. The method of claim 22 wherein said absorbent coating provides a base for said item of fishing tackle for the application of said liquid fish attractant to adhere to said item instead of running off of said item.

35. The method of claim 22 wherein said polymer or co-polymer particles are selected so that said finish or absorbent coating becomes translucent upon absorbing said liquid fish attractant allowing color of said finish coating to show through.

36. The method of claim 22 wherein desired gel characteristics of said absorbent coating are achieved by adjusting the degree of cross linking of the polymer or co-polymer particles by
   a) decreasing the amount of cross linking to decrease its strength, increase its rate of absorption and soften its gel characteristics or b) increasing the amount of cross linking to increase its strength, decrease its rate of absorption and harden its gel characteristics.

37. The method of claim 36 wherein said absorbent coating is made from different polymer or co-polymer particles such that different coating textures, from a soft gel to a hard plastic, are obtained upon absorbing said liquid fish attractant.

38. The method of claim 36 wherein said polymer or co-polymer particles are a mixture of different polymer or co-polymer particles such that each polymer or co-polymer particle absorbs a different liquid fish attractant or liquid fish attractants at different rates.

39. The method of claim 22 wherein said polymer or co-polymer particles are expanded to a particular volume before or after bonding to said item of fishing tackle to increase the rate of absorption of said liquid finish coating and said liquid fish attractant by the use of blowing agents, freeze drying, or aerogel processes.

40. The method of claim 22 wherein said item of fishing tackle is selected from the group consisting of lures, weights, spoons and hooks.

41. The method of claim 22 wherein said absorbent coating of said item of fishing tackle can be recharged after said absorbent coating loses said liquid fish attractant due to evaporation or leaching out by reapplying said liquid fish attractant.

42. The method of claim 22 wherein said polymer or co-polymer particles have the shape of spheres or flat disks.

* * * * *